US009128519B1

(12) United States Patent
Coates et al.

(10) Patent No.: US 9,128,519 B1
(45) Date of Patent: Sep. 8, 2015

(54) METHOD AND SYSTEM FOR STATE-BASED CONTROL OF OBJECTS

(75) Inventors: Malik Coates, San Francisco, CA (US); Russell H. Belfer, Burlingame, CA (US); Steve Fink, San Carlos, CA (US); John Paul D'India, San Francisco, CA (US)

(73) Assignee: Intellectual Ventures Holding 67 LLC, Las Vegas, NV (US)

(*) Notice: Subject to any disclaimer, the term of this patent is extended or adjusted under 35 U.S.C. 154(b) by 1572 days.

(21) Appl. No.: 11/106,898

(22) Filed: Apr. 15, 2005

(51) Int. Cl.
*G09F 5/00* (2006.01)
*G06F 3/01* (2006.01)

(52) U.S. Cl.
CPC ........................................ *G06F 3/011* (2013.01)

(58) Field of Classification Search
CPC ........................................................ G06F 3/011
See application file for complete search history.

(56) References Cited

U.S. PATENT DOCUMENTS

| | | |
|---|---|---|
| 2,917,980 A | 12/1959 | Grube et al. |
| 3,068,754 A | 12/1962 | Benjamin et al. |
| 3,763,468 A | 10/1973 | Ovshinsky et al. |
| 4,053,208 A | 10/1977 | Kato et al. |
| 4,275,395 A | 6/1981 | Dewey et al. |
| 4,573,191 A | 2/1986 | Kidode et al. |
| 4,725,863 A | 2/1988 | Dumbreck et al. |
| 4,769,697 A | 9/1988 | Gilley et al. |
| 4,791,572 A | 12/1988 | Green et al. |
| 4,843,568 A | 6/1989 | Krueger et al. |
| 4,887,898 A | 12/1989 | Halliburton et al. |
| 4,948,371 A | 8/1990 | Hall |
| 5,001,558 A | 3/1991 | Burley et al. |
| 5,138,304 A | 8/1992 | Bronson |
| 5,151,718 A | 9/1992 | Nelson |
| 5,239,373 A | 8/1993 | Tang et al. |
| 5,276,609 A | 1/1994 | Durlach |
| 5,319,496 A | 6/1994 | Jewell et al. |
| 5,325,472 A | 6/1994 | Horiuchi et al. |
| 5,325,473 A | 6/1994 | Monroe et al. |

(Continued)

FOREIGN PATENT DOCUMENTS

| | | |
|---|---|---|
| EP | 0 055 366 A2 | 7/1982 |
| EP | 0 626 636 A2 | 11/1994 |

(Continued)

OTHER PUBLICATIONS

Reactrix, Inc website, Mar. 28, 2003, http://web.archive.org/web/20030328234205/http://www.reactrix.com and http://web.archive.org/web/20030328234205/http://www.reactrix.com/webdemo.php.*

(Continued)

*Primary Examiner* — Mahesh Dwivedi
(74) *Attorney, Agent, or Firm* — Knobbe Martens Olson & Bear LLP

(57) ABSTRACT

A method and system for state-based control of objects. A simulator controls data associated with a plurality of objects, the simulator including a first list of the plurality of objects and a data structure comprising data defining the plurality of objects. A state manager includes a plurality of states, wherein a state includes a second list of a subset of objects of the plurality of objects and determines a display appearance and a display action of the subset of objects. A plurality of software nodes are operable to perform associated operations on subsets of objects and to update data of the data structure for the subset of the objects.

20 Claims, 4 Drawing Sheets

(56) References Cited

U.S. PATENT DOCUMENTS

| | | |
|---|---|---|
| 5,418,583 A | 5/1995 | Masumoto |
| 5,426,474 A | 6/1995 | Rubtsov et al. |
| 5,436,639 A | 7/1995 | Arai et al. |
| 5,442,252 A | 8/1995 | Golz |
| 5,454,043 A | 9/1995 | Freeman |
| 5,473,396 A | 12/1995 | Okajima et al. |
| 5,497,269 A | 3/1996 | Gal |
| 5,510,828 A | 4/1996 | Lutterbach et al. |
| 5,526,182 A | 6/1996 | Jewell et al. |
| 5,528,263 A | 6/1996 | Platzker et al. |
| 5,528,297 A | 6/1996 | Seegert et al. |
| 5,534,917 A | 7/1996 | MacDougall |
| 5,548,694 A | 8/1996 | Gibson |
| 5,591,972 A | 1/1997 | Noble et al. |
| 5,594,469 A | 1/1997 | Freeman et al. |
| 5,633,691 A | 5/1997 | Vogeley et al. |
| 5,662,401 A | 9/1997 | Shimizu et al. |
| 5,703,637 A | 12/1997 | Miyazaki et al. |
| 5,771,307 A | 6/1998 | Lu et al. |
| 5,808,784 A | 9/1998 | Ando et al. |
| 5,846,086 A | 12/1998 | Bizzi et al. |
| 5,861,881 A | 1/1999 | Freeman et al. |
| 5,882,204 A | 3/1999 | Iannazo et al. |
| 5,900,982 A | 5/1999 | Dolgoff et al. |
| 5,923,380 A | 7/1999 | Yang et al. |
| 5,923,475 A | 7/1999 | Kurtz et al. |
| 5,953,152 A | 9/1999 | Hewlett |
| 5,966,696 A | 10/1999 | Giraud |
| 5,969,754 A | 10/1999 | Zeman |
| 5,978,136 A | 11/1999 | Ogawa et al. |
| 5,982,352 A | 11/1999 | Pryor |
| 6,008,800 A | 12/1999 | Pryor |
| 6,058,397 A * | 5/2000 | Barrus et al. ............... 707/104.1 |
| 6,075,895 A | 6/2000 | Qiao et al. |
| 6,084,979 A | 7/2000 | Kanade et al. |
| 6,088,612 A | 7/2000 | Blair |
| 6,097,369 A | 8/2000 | Wambach |
| 6,106,119 A | 8/2000 | Edwards |
| 6,118,888 A | 9/2000 | Chino et al. |
| 6,125,198 A | 9/2000 | Onda |
| 6,166,744 A | 12/2000 | Jaszlics et al. |
| 6,176,782 B1 | 1/2001 | Lyons et al. |
| 6,191,773 B1 | 2/2001 | Maruno et al. |
| 6,198,487 B1 | 3/2001 | Fortenbery et al. |
| 6,198,844 B1 | 3/2001 | Nomura |
| 6,217,449 B1 | 4/2001 | Kaku |
| 6,254,246 B1 | 7/2001 | Tiao et al. |
| 6,263,339 B1 * | 7/2001 | Hirsch .......................... 707/102 |
| 6,270,403 B1 | 8/2001 | Watanabe et al. |
| 6,278,418 B1 | 8/2001 | Doi |
| 6,292,171 B1 | 9/2001 | Fu et al. |
| 6,304,267 B1 | 10/2001 | Sata |
| 6,308,565 B1 | 10/2001 | French et al. |
| 6,323,895 B1 | 11/2001 | Sata |
| 6,333,735 B1 | 12/2001 | Anvekar |
| 6,335,977 B1 | 1/2002 | Kage |
| 6,339,748 B1 | 1/2002 | Hiramatsu |
| 6,349,301 B1 * | 2/2002 | Mitchell et al. ............... 707/101 |
| 6,351,222 B1 | 2/2002 | Swan et al. |
| 6,353,428 B1 | 3/2002 | Maggioni et al. |
| 6,359,612 B1 | 3/2002 | Peter et al. |
| 6,388,657 B1 | 5/2002 | Natoli |
| 6,394,896 B2 | 5/2002 | Sugimoto |
| 6,400,374 B2 | 6/2002 | Lanier |
| 6,407,870 B1 | 6/2002 | Hurevich et al. |
| 6,414,672 B2 | 7/2002 | Rekimoto et al. |
| 6,445,815 B1 | 9/2002 | Sato |
| 6,454,419 B2 | 9/2002 | Kitazawa |
| 6,464,375 B1 | 10/2002 | Wada et al. |
| 6,480,267 B2 | 11/2002 | Yanagi et al. |
| 6,491,396 B2 | 12/2002 | Karasawa et al. |
| 6,501,515 B1 | 12/2002 | Iwamura |
| 6,513,953 B1 | 2/2003 | Itoh |
| 6,522,312 B2 | 2/2003 | Ohshima et al. |
| 6,545,706 B1 | 4/2003 | Edwards et al. |
| 6,552,760 B1 | 4/2003 | Gotoh et al. |
| 6,598,978 B2 | 7/2003 | Hasegawa |
| 6,607,275 B1 | 8/2003 | Cimini et al. |
| 6,611,241 B1 | 8/2003 | Firester et al. |
| 6,654,734 B1 | 11/2003 | Mani et al. |
| 6,658,150 B2 | 12/2003 | Tsuji et al. |
| 6,661,918 B1 | 12/2003 | Gordon et al. |
| 6,677,969 B1 | 1/2004 | Hongo |
| 6,707,054 B2 | 3/2004 | Ray |
| 6,707,444 B1 | 3/2004 | Hendriks et al. |
| 6,712,476 B1 | 3/2004 | Ito et al. |
| 6,720,949 B1 | 4/2004 | Pryor et al. |
| 6,732,929 B2 | 5/2004 | Good et al. |
| 6,747,666 B2 | 6/2004 | Utterback et al. |
| 6,752,720 B1 | 6/2004 | Clapper et al. |
| 6,754,370 B1 | 6/2004 | Hall-Holt et al. |
| 6,791,700 B2 | 9/2004 | Omura et al. |
| 6,808,293 B2 | 10/2004 | Watanabe et al. |
| 6,826,727 B1 | 11/2004 | Mohr et al. |
| 6,831,664 B2 | 12/2004 | Marmaropoulos et al. |
| 6,871,982 B2 | 3/2005 | Holman et al. |
| 6,873,710 B1 | 3/2005 | Cohen-Solal et al. |
| 6,877,882 B1 | 4/2005 | Haven et al. |
| 6,882,480 B2 | 4/2005 | Yanagisawa |
| 6,902,310 B2 | 6/2005 | Im |
| 6,912,313 B2 | 6/2005 | Li |
| 6,965,693 B1 | 11/2005 | Kondo et al. |
| 6,975,360 B2 | 12/2005 | Slatter |
| 6,999,600 B2 | 2/2006 | Venetianer |
| 7,000,200 B1 | 2/2006 | Martins |
| 7,015,894 B2 | 3/2006 | Morohoshi |
| 7,042,440 B2 | 5/2006 | Pryor |
| 7,054,068 B2 | 5/2006 | Yoshida et al. |
| 7,058,204 B2 | 6/2006 | Hildreth et al. |
| 7,068,274 B2 | 6/2006 | Welch et al. |
| 7,069,516 B2 | 6/2006 | Rekimoto |
| 7,084,859 B1 | 8/2006 | Pryor et al. |
| 7,088,508 B2 | 8/2006 | Ebina et al. |
| 7,129,927 B2 | 10/2006 | Mattsson |
| 7,149,262 B1 | 12/2006 | Nayar et al. |
| 7,158,676 B1 | 1/2007 | Rainsford |
| 7,170,492 B2 | 1/2007 | Bell |
| 7,190,832 B2 | 3/2007 | Frost et al. |
| 7,193,608 B2 | 3/2007 | Stuerzlinger |
| 7,227,526 B2 | 6/2007 | Hildreth et al. |
| 7,259,747 B2 | 8/2007 | Bell |
| 7,262,874 B2 | 8/2007 | Suzuki |
| 7,268,950 B2 | 9/2007 | Poulsen |
| 7,289,130 B1 | 10/2007 | Satoh et al. |
| 7,330,584 B2 | 2/2008 | Weiguo et al. |
| 7,331,856 B1 | 2/2008 | Nakamura et al. |
| 7,339,521 B2 | 3/2008 | Scheidemann et al. |
| 7,348,963 B2 | 3/2008 | Bell |
| 7,379,563 B2 | 5/2008 | Shamaie |
| 7,382,897 B2 | 6/2008 | Brown et al. |
| 7,394,459 B2 | 7/2008 | Bathiche et al. |
| 7,428,542 B1 | 9/2008 | Fink et al. |
| 7,431,253 B2 | 10/2008 | Yeh |
| 7,432,917 B2 | 10/2008 | Wilson et al. |
| 7,468,742 B2 | 12/2008 | Ahn et al. |
| 7,536,032 B2 | 5/2009 | Bell |
| 7,559,841 B2 | 7/2009 | Hashimoto |
| 7,576,727 B2 | 8/2009 | Bell |
| 7,598,942 B2 | 10/2009 | Underkoffler et al. |
| 7,619,824 B2 | 11/2009 | Poulsen |
| 7,665,041 B2 | 2/2010 | Wilson et al. |
| 7,671,321 B2 | 3/2010 | Perlman et al. |
| 7,710,391 B2 | 5/2010 | Bell et al. |
| 7,728,280 B2 | 6/2010 | Feilkas et al. |
| 7,737,636 B2 | 6/2010 | Li et al. |
| 7,738,725 B2 | 6/2010 | Raskar et al. |
| 7,745,771 B2 | 6/2010 | Troxell et al. |
| RE41,685 E | 9/2010 | Feldman et al. |
| 7,809,167 B2 | 10/2010 | Bell |
| 7,834,846 B1 | 11/2010 | Bell |
| 7,961,906 B2 | 6/2011 | Ruedin |
| 7,971,156 B2 | 6/2011 | Albertson et al. |
| 8,018,579 B1 | 9/2011 | Krah |
| 8,035,612 B2 | 10/2011 | Bell et al. |

(56) References Cited

U.S. PATENT DOCUMENTS

| | | | |
|---|---|---|---|
| 8,035,624 | B2 | 10/2011 | Bell et al. |
| 8,081,822 | B1 | 12/2011 | Bell |
| 8,085,293 | B2 | 12/2011 | Brodsky et al. |
| 8,085,994 | B2 | 12/2011 | Kim |
| 8,098,277 | B1 | 1/2012 | Bell |
| 8,159,682 | B2 | 4/2012 | Bell |
| 8,199,108 | B2 | 6/2012 | Bell et al. |
| 8,230,367 | B2 | 7/2012 | Bell et al. |
| 8,259,163 | B2 | 9/2012 | Bell et al. |
| 2001/0012001 | A1 | 8/2001 | Rekimoto et al. |
| 2001/0033675 | A1 | 10/2001 | Maurer et al. |
| 2002/0006583 | A1 | 1/2002 | Michiels et al. |
| 2002/0032697 | A1 | 3/2002 | French et al. |
| 2002/0041327 | A1 | 4/2002 | Hildreth et al. |
| 2002/0046100 | A1 | 4/2002 | Kinjo |
| 2002/0064382 | A1 | 5/2002 | Hildreth et al. |
| 2002/0073417 | A1 | 6/2002 | Kondo et al. |
| 2002/0078441 | A1 | 6/2002 | Drake et al. |
| 2002/0081032 | A1 | 6/2002 | Chen et al. |
| 2002/0103617 | A1 | 8/2002 | Uchiyama et al. |
| 2002/0105623 | A1 | 8/2002 | Pinhanez |
| 2002/0130839 | A1* | 9/2002 | Wallace et al. ............... 345/157 |
| 2002/0140633 | A1 | 10/2002 | Rafii et al. |
| 2002/0140682 | A1 | 10/2002 | Brown et al. |
| 2002/0178440 | A1 | 11/2002 | Agnihotri et al. |
| 2002/0186221 | A1 | 12/2002 | Bell |
| 2003/0032484 | A1 | 2/2003 | Ohshima et al. |
| 2003/0065563 | A1 | 4/2003 | Elliott et al. |
| 2003/0091724 | A1 | 5/2003 | Mizoguchi |
| 2003/0093784 | A1 | 5/2003 | Dimitrova et al. |
| 2003/0098819 | A1 | 5/2003 | Sukthankar et al. |
| 2003/0103030 | A1 | 6/2003 | Wu |
| 2003/0113018 | A1 | 6/2003 | Nefian et al. |
| 2003/0122839 | A1 | 7/2003 | Matraszek et al. |
| 2003/0126013 | A1 | 7/2003 | Shand |
| 2003/0137494 | A1 | 7/2003 | Tulbert |
| 2003/0161502 | A1 | 8/2003 | Morihara et al. |
| 2003/0178549 | A1 | 9/2003 | Ray |
| 2004/0005924 | A1 | 1/2004 | Watabe et al. |
| 2004/0015783 | A1 | 1/2004 | Lennon et al. |
| 2004/0046736 | A1 | 3/2004 | Pryor et al. |
| 2004/0046744 | A1 | 3/2004 | Rafii et al. |
| 2004/0073541 | A1 | 4/2004 | Lindblad et al. |
| 2004/0091110 | A1 | 5/2004 | Barkans |
| 2004/0183775 | A1 | 9/2004 | Bell |
| 2004/0212725 | A1 | 10/2004 | Raskar et al. |
| 2005/0028188 | A1 | 2/2005 | Latona et al. |
| 2005/0039206 | A1 | 2/2005 | Opdycke |
| 2005/0086695 | A1 | 4/2005 | Keele et al. |
| 2005/0088407 | A1 | 4/2005 | Bell |
| 2005/0089194 | A1 | 4/2005 | Bell |
| 2005/0104506 | A1 | 5/2005 | Youh et al. |
| 2005/0110964 | A1 | 5/2005 | Bell |
| 2005/0122308 | A1 | 6/2005 | Bell et al. |
| 2005/0132266 | A1 | 6/2005 | Ambrosino et al. |
| 2005/0147135 | A1 | 7/2005 | Kurtz et al. |
| 2005/0147282 | A1 | 7/2005 | Fujii |
| 2005/0162381 | A1 | 7/2005 | Bell et al. |
| 2005/0185828 | A1 | 8/2005 | Semba et al. |
| 2005/0195598 | A1 | 9/2005 | Dancs et al. |
| 2005/0265587 | A1 | 12/2005 | Schneider |
| 2006/0001760 | A1 | 1/2006 | Matsumura et al. |
| 2006/0010400 | A1 | 1/2006 | Dehlin et al. |
| 2006/0031786 | A1 | 2/2006 | Hillis et al. |
| 2006/0078015 | A1 | 4/2006 | Franck |
| 2006/0132432 | A1 | 6/2006 | Bell |
| 2006/0132725 | A1 | 6/2006 | Terada et al. |
| 2006/0168515 | A1 | 7/2006 | Dorsett, Jr. et al. |
| 2006/0184993 | A1 | 8/2006 | Goldthwaite et al. |
| 2006/0187545 | A1 | 8/2006 | Doi |
| 2006/0227099 | A1 | 10/2006 | Han et al. |
| 2006/0242145 | A1 | 10/2006 | Krishnamurthy et al. |
| 2006/0256382 | A1 | 11/2006 | Matraszek et al. |
| 2006/0258397 | A1 | 11/2006 | Kaplan et al. |
| 2006/0294247 | A1 | 12/2006 | Hinckley et al. |
| 2007/0002039 | A1 | 1/2007 | Pendleton et al. |
| 2007/0019066 | A1 | 1/2007 | Cutler |
| 2007/0285419 | A1 | 12/2007 | Givon |
| 2008/0013826 | A1 | 1/2008 | Hillis et al. |
| 2008/0018595 | A1 | 1/2008 | Hildreth et al. |
| 2008/0030460 | A1 | 2/2008 | Hildreth et al. |
| 2008/0036732 | A1 | 2/2008 | Wilson et al. |
| 2008/0040692 | A1 | 2/2008 | Sunday et al. |
| 2008/0062123 | A1 | 3/2008 | Bell |
| 2008/0062257 | A1 | 3/2008 | Corson |
| 2008/0090484 | A1 | 4/2008 | Lee et al. |
| 2008/0150890 | A1 | 6/2008 | Bell et al. |
| 2008/0150913 | A1 | 6/2008 | Bell et al. |
| 2008/0252596 | A1 | 10/2008 | Bell et al. |
| 2009/0027337 | A1 | 1/2009 | Hildreth |
| 2009/0077504 | A1 | 3/2009 | Bell et al. |
| 2009/0079813 | A1 | 3/2009 | Hildreth |
| 2009/0102788 | A1 | 4/2009 | Nishida et al. |
| 2009/0172606 | A1 | 7/2009 | Dunn et al. |
| 2009/0179733 | A1 | 7/2009 | Hattori et al. |
| 2009/0225196 | A1 | 9/2009 | Bell et al. |
| 2009/0235295 | A1 | 9/2009 | Bell et al. |
| 2009/0251685 | A1 | 10/2009 | Bell et al. |
| 2010/0026624 | A1 | 2/2010 | Bell et al. |
| 2010/0039500 | A1 | 2/2010 | Bell et al. |
| 2010/0060722 | A1 | 3/2010 | Bell et al. |
| 2010/0121866 | A1 | 5/2010 | Bell et al. |
| 2011/0157316 | A1 | 6/2011 | Okamoto et al. |
| 2012/0080411 | A1 | 4/2012 | Mizuyama et al. |
| 2012/0200843 | A1 | 8/2012 | Bell et al. |
| 2012/0287044 | A1 | 11/2012 | Bell et al. |
| 2012/0293625 | A1 | 11/2012 | Schneider et al. |
| 2012/0317511 | A1 | 12/2012 | Bell et al. |

FOREIGN PATENT DOCUMENTS

| | | | |
|---|---|---|---|
| EP | 0 913 790 | A1 | 5/1999 |
| EP | 1 689 172 | A1 | 6/2002 |
| JP | 57-094672 | A | 6/1982 |
| JP | 10-207619 | | 8/1998 |
| JP | 11-057216 | | 3/1999 |
| JP | 2000-105583 | | 4/2000 |
| JP | 2002-014997 | | 1/2002 |
| JP | 2002-092023 | | 3/2002 |
| JP | 2002-171507 | | 6/2002 |
| JP | 2003-517642 | | 5/2003 |
| JP | 2003-271084 | | 9/2003 |
| JP | 2004-246578 | | 9/2004 |
| JP | 2007-514242 | | 5/2007 |
| KR | 2003-0058894 | | 7/2003 |
| WO | WO 98/38533 | A1 | 9/1998 |
| WO | WO 00/16562 | A1 | 3/2000 |
| WO | WO 01/63916 | A1 | 8/2001 |
| WO | WO 02/01537 | | 1/2002 |
| WO | WO 02/100094 | A2 | 12/2002 |
| WO | WO 2004/055776 | A1 | 7/2004 |
| WO | WO 2004/097741 | A1 | 11/2004 |
| WO | WO 2005/003948 | | 1/2005 |
| WO | WO 2005/041578 | A2 | 5/2005 |
| WO | WO 2005/041579 | A3 | 5/2005 |
| WO | WO 2005/057398 | A2 | 6/2005 |
| WO | WO 2005/057399 | A2 | 6/2005 |
| WO | WO 2005/057921 | A2 | 6/2005 |
| WO | WO 2005/091651 | A2 | 9/2005 |
| WO | WO 2007/019443 | A1 | 2/2007 |
| WO | WO 2008/124820 | A1 | 10/2008 |
| WO | WO 2009/035705 | A1 | 3/2009 |

OTHER PUBLICATIONS

Screenshots of Reactrix Product Demo Video, Mar. 28, 2003, http://web.archive.org/web/20030407174258/http://www.reactrix.com/demo/reactrix_demo.wmv.*

EffecTV Version 0.2.0 released Mar. 27, 2001, available online at <http://web.archive.org/web/20010101-20010625re_http://effectv.sourceforge.net>.

Index of EffecTV, as downloaded on Apr. 30, 2007 at <http://effectv.cvs.sourceforge.net/effectv/EffecTV/?pathrev=rel_0_2_0>.

(56) References Cited

OTHER PUBLICATIONS

R111, The Transformation From Digital Information to Analog Matter, available online at <http://www.particles.de/paradocs/r111/10mkp2004/hmtl/r111_text111hock04.html>, cited on Jan. 17, 2005 during opposition of European Application No. 02739710.8, fil. 2001 Symposium on Interactive 3D Graphics program description, ACM SIGGRAPH, held Mar. 19-21, 2001, Research Triangle Park, NC, downloaded from <http://www.allconferences.com/conferences/2000830092631/>; cited during opposition of European Application No.
Affidavit of Daniel Barthels regarding EffecTV, dated May 15, 2007 (partial machine translation), cited during opposition of European Application No. 02739710.8, filed Jun. 4, 2002.
Announcement: Workshop on Perceptual User Interfaces, the Banff Rocky Mountain Resort, Banff, Alberta, Canada, Oct. 20-21, 1997, can be found at <http://www.research.microsoft.com/PUIWorkshop/>, cited during opposition of European Application No. 02739.
Bodymover Body Movement as a Means to Obtain an Audiovisual Spatial Experience, 2000 ART+COM AG Berlin; <http://www.artcom.de/index.php?option=com_acprojects&page=6&id=28&Itemid=144&details=0&lang=en>, as downloaded on Aug. 8, 2005.
ART+COM Bodymover 2000, as downloaded on Aug. 21, 2009 from <http://www.artcom.de/index.php?option=com_acprojects&page=6&id=28&Itemid=144&details=0&lang=en>, cited during opposition of European Application No. 02739710.8, filed Jun. 4, 2002.
Article 96(2) Communication dated Feb. 25, 2005 in European Application No. 02739710.8.
Article 96(2) Communication dated Mar. 31, 2004 in European Application No. 02739710.8.
Brown, Matthew, et al. "Multi-Image Matching using Multi-Scale Oriented Patches," Technical Report, Dec. 2004, pp. 1-48, available online at <ftp://ftp.research.microsoft.com/pub/tr/TR-2004133.pdf>.
Brown, Matthew, et al., "Multi-Image Matching using Multi-Scale Oriented Patches," Proceedings of the 2005 IEEE Computer Society Conference on Computer Vision and Pattern Recognition, Conference Publication Date: Jun. 20-25, 2005, 8 pgs.
Buxton, Bill, "Multi-Touch Systems That I Have Known and Loved," accessed Mar. 21, 2007, <http://billbuxton.com/multitouchOverview.html>.
Communication dated Dec. 10, 2008 from Patentanwalt attaching article by Katy Bachman, entitled "Reactrix Up for Sale," cited during opposition of European Application No. 02739710.8, filed Jun. 4, 2002.
Crouser, P.D., et al., "Unattenuated tracer particle extraction through time-averaged, background image subtraction with outlier rejection," Experiments in Fluids, 22, 1997, 220-228, Springer-Verlag.
Davis, J.W., et al., "SIDEshow: A Silhouette-based Interactive Dual-screen Environment," Aug. 1998, MIT Media Lab Tech Report No. 457.
Demarest, Ken, "Sand," 2000, Mine Control, art installation, available online at <http://www.mine-control.com>, downloaded on Mar. 15, 2007.
EffecTV Software Source: effect module, dated May 20, 2001 (German); cited during opposition of European Application No. 02739710.8, filed Jun. 4, 2002.
Elgammal, Ahmed, et al., "Non-parametric Model for Background Subtraction," Jun. 2000, European Conference on Computer Vision, Lecture Notes on Computer Science, vol. 1843, pp. 751-767.
Extended Search Report for European Application No. 06010825.5, filed Jun. 4, 2002.
Dachselt, Raimund, et al., "CONTIGRA: An XML-Based Architecture for Component-Oriented 3D Applications, 3D Technologies for the World Wide Web, Proceedings of the Seventh International Conference on 3D Technology," ACM, Feb. 24-28, 2002, pp. 155-163.
Foerterer, Holger, "Fluidum," 1999, art installation, description available online at <http://www.foerterer.com/fluidum>, downloaded on Mar. 16, 2007.

Foerterer, Holger, "Helikopter," 2001, art installation, description available online at <http://www.foerterer.com/helikopter/index.htm>, downloaded on Mar. 16, 2007.
Freeman, William, et al., "Computer vision for interactive computer graphics," May-Jun. 1998, IEEE Computer Graphics and Applications, vol. 18, No. 3, pp. 42-53.
Frisken, Sarah F. et al., "Adaptively Sampled Distance Fields: A General Representation of Shape for Computer Graphics," Jul. 23-28, 2000, Proceedings of the 27th Annual Conference on Computer Graphics and Interactive Techniques, pp. 249-254.
Fujihata, Masaki, "Beyond Pages," 1995, art installation, description available online at <http://on1.zkm.de/zkm/werke/BeyondPages>, downloaded on Mar. 16, 2007.
Goetz, Frank, et al., "An XML-based Visual Shading Language for Vertex and Fragment Shaders," 3D Technologies for the World Wide Web, Proceedings of Ninth International Conference on 3D Technology; ACM, Apr. 5-8, 2004; pp. 87-97.
GroundFX Document, GestureTek (Very Vivid, Inc.), description available online at <http://www.gesturetek.com/groundfx>, downloaded on Aug. 11, 2006.
Haller, Michael et al., "Coeno-Storyboard: An Augmented Surface for Storyboard Presentations," Mensch & Computer 2005, Sep. 4-7, 2005, Linz, Austria.
Han, Jefferson Y., "Low-Cost Multi-Touch Sensing Through Frustrated Total Internal Reflection," Oct. 23-26, 2005, ACM Symposium on User Interface Software and Technology (UIST).
Harville, Michael et al., "Foreground Segmentation Using Adaptive Mixture Models in Color and Depth," Jul. 8, 2001, Proceedings of IEEE Workshop on Detection and Recognition of Events in Video, pp. 3-11.
Hemmer, Raphael Lozano, "Body Movies," 2002, art project/installation, description available online at <http://www.lozano-hemmer.com/eproyecto.html>, downloaded on Mar. 16, 2007.
Hoff, Kenneth E. III et al, "Fast and Simple 2D Geometric Proximity Queries Using Graphics Hardware," Mar. 19-21, 2001, Proc. of the 2001 Symposium on Interactive 3D Graphics, pp. 145-148.
International Preliminary Examination Report for PCT/US2002/017843, filed Jun. 4, 2002.
International Preliminary Report on Patentability for PCT/US2004/035477, filed Oct. 25, 2004.
International Preliminary Report on Patentability for PCT/US2004/035478, filed Oct. 25, 2004.
International Preliminary Report on Patentability for PCT/US2004/041318, filed Dec. 9, 2004.
International Preliminary Report on Patentability for PCT/US2004/041319, filed Dec. 9, 2004.
International Preliminary Report on Patentability for PCT/US2004/041320, filed Dec. 9, 2004.
International Preliminary Report on Patentability for PCT/US2005/008984, filed Mar. 18, 2005.
International Preliminary Report on Patentability for PCT/US2006/030720, filed on Aug. 4, 2006.
International Preliminary Report on Patentability for PCT/US2008/059900, filed on Apr. 10, 2008.
International Search Report for PCT/US03/40321, filed Dec. 15, 2003.
International Search Report for PCT/US2002/017843, filed Jun. 4, 2002, dated Feb. 5, 2003.
International Search Report for PCT/US2004/035477, filed Oct. 25, 2004.
Invitation to Pay Additional Fees and Partial international Search Report on Patentability for PCT/US2004/035478, filed Oct. 25, 2004.
International Search Report for PCT/US2004/035478, filed Oct. 25, 2004.
International Search Report for PCT/US2004/041318, filed Dec. 9, 2004.
International Search Report for PCT/US2004/041319, filed Dec. 9, 2004.
International Search Report for PCT/US2004/041320, filed Dec. 9, 2004.
International Search Report for PCT/US2005/008984, filed Mar. 18, 2005.

(56) References Cited

OTHER PUBLICATIONS

International Search Report for PCT/US2006/030720, filed Aug. 4, 2006.
International Search Report for PCT/US2008/059900, filed Apr. 10, 2008.
International Search Report for PCT/US2008/10750, filed Sep. 15, 2008.
International Preliminary Report on Patentability for PCT/US2008/10750, filed Sep. 15, 2008.
Ivars Peterson, "Artificial reality; combining a person's live video image with computer graphics suggests novel ways of working and playing with computers" Science News, Jun. 22, 1985.
Jabri, Sumer et al., "Detection and Location of People in Video Images Using Adaptive Fusion of Color and Edge Information;" presented at the Int. Conf. Pattern Recognition, Barcelona, Spain, 2000.
Joyce, Arthur W. III, et al., "Implementation and capabilities of a virtual interaction system," Sep. 10-11, 1998, Proceedings 2nd European Conference on Disability, Virtual Reality and Associated Technologies, Skovde, Sweden, pp. 237-245.
Katz, Itai et al., "A Multi-Touch Surface Using Multiple Cameras," Oct. 3, 2007, Advanced Concepts for Intelligent Vision Systems, vol. 4678/2007.
Keays, Bill, "metaField Maze," 1998, exhibited at Siggraph'99 Emerging Technologies and Ars Electronica Aug. 8-13, 1999, description available online at <http://www.billkeays.conn/metaFieldInfosheet1A.pdf>.
Keays, Bill, "Using High-Bandwidth Input/Output in Interactive Art," Jun. 1999, Master's Thesis, Massachusetts Institute of Technology, School of Architecture and Planning.
Khan, Jeff; "Intelligent Room with a View"; Apr.-May 2004, RealTime Arts Magazine, Issue 60, available online at <www.realtimearts.net/article/60/7432>.
Kjeldesn, Rick et al., "Dynamically Reconfigurable Vision-Based User Interfaces," Apr. 2003, 3rd International Conference on Vision Systems (ICVVS '03), Graz, Austria, pp. 6-12.
Kjeldsen, R. et al., "Interacting with Steerable Projected Displays," May 20-21, 2002, Proceedings of the 5th International Conference on Automatic Face and Gesture Recognition, Washington, D.C.
Kreuger, Myron, "Videoplace—An Artificial Reality," Apr. 1985, Conference on Human Factors in Computing Systems, San Francisco, California, pp. 35-40.
Kreuger, Myron, "Videoplace," 1969 and subsequent, summary available online at <http://www.jtnimoy.com/itp/newmediahistory/videoplace>, downloaded Mar. 21, 2007.
Kurapati, Kaushal, et al., "A Multi-Agent TV Recommender," Jul. 13-14, 2001, Workshop on Personalization in Future TV, pp. 1-8, XP02228335.
Lamarre, Mathieu, et al., "Background subtraction using competing models in the block-DCT domain," Pattern Recognition, 2002 Proceedings, 16 International Conference in Quebec City, Que., Canada, Aug. 11-15, 2002.
Lantagne, Michel, et al., "VIP: Vision tool for comparing Images of People," Vision Interface, Jun. 11-13, 2003, pp. 1-8.
Leibe, Bastian, et al., "Towards Spontaneous Interaction with the Perceptive Workbench, a Semi-Immersive Virtual Environment," Nov./Dec. 2000, IEEE Computer Graphics and Applications, vol. 20, No. 6, pp. 54-65.
Lengyel, Jed et al., "Real-Time Robot Motion Planning Using Rasterizing Computer Graphics Hardware," Aug. 1990, ACM SIGGRAPH Computer Graphics, vol. 24, Issue 4, pp. 327-335.
Levin, Golan "Computer Vision for Artists and Designers: Pedagogic Tools and Techniques for Novice Programmers," Aug. 2006, AI & Society, vol. 20, Issue 4, pp. 462-482.
Letter of the opponent O2 dated May 28, 2010 in European Application No. 02739710.8, filed Jun. 4, 2002.
Letter dated May 16, 2007 from Christian Zuckschwerdt regarding EffecTV, (partial machine translation), cited during opposition of European Application No. 02739710.8, filed Jun. 4, 2002.
Lin, Mingxiu et al., "A New Approach for Vision-based Rear Vehicle Tracking," Key Laboratory of Integrated Automation of Process Industry, Ministry of Education, Northeastern University, Shenyang, Liaoning Province, China, held May 23-25, 2007, pp. 107-1.
Livingston, Mark Alan, "Vision-based Tracking with Dynamic Structured Light for Video See-through Augmented Reality," 1998, Ph.D. Dissertation, University of North Carolina at Chapel Hill, cited on Jun. 18, 2007 during opposition of European Application N.
Malik, Shahzad et al., "Visual Touchpad: A Two-Handed Gestural Input Device," Oct. 13-15, 2004, International Conference on Multimodal Interfaces (ICMI '04).
MacIver, Malcolm, et al., "Body Electric," Apr. 15-Jun. 29, 2003, art installation, description available online at <http://www.neuromech.northwestern.edu/uropatagium/#ArtSci>.
Mandala Systems, "Video Gesture Control System Concept," 1986, description available online at <http://www.vividgroup.com/tech.html>, downloaded on Mar. 16, 2007.
Microsoft Surface multi-touch interface table unveiled, May 30, 2007, downloaded from <http://www.dancewithshadows.com/tech/microsoft-surface.asp>.
Microsoft Surface Web Page, downloaded from <http://www.microsoft.com/surface/Pages/Product/WhatIs.aspx> on Sep. 24, 2009.
Experience Microsoft Surface, downloaded from <http://www.microsoft.com/surface/Pages/Product/Specifications.asp x> on Sep. 24, 2009.
Microsoft Surface, downloaded from <http://en.wikipedia.org/wiki/Microsoft_surface> on Sep. 24, 2009.
Mitsubishi DiamondTouch, <http://www.merl.com/projects/DiamondTouch/> visited Mar. 21, 2007.
Mo, Zhenyao "SmartCanvas: A Gesture-Driven Intelligent Drawing Desk System," Jan. 9-12, 2005, Proceedings of Intelligent User Interfaces (IUI '05).
Morano, Raymond A. et al., "Structured Light Using Pseudorandom Codes," Mar. 1998, IEEE Transactions on Pattern Analysis and Machine Intelligence, vol. 20, No. 3.
Morris, T. et al., "Real-Time Fingertip Detection for Hand Gesture Recognition," Sep. 9-11, 2002, Advanced Concepts for Intelligent Vision Systems (ACIVS '04), Ghent University, Belgium.
Muench, Wolfgang, "Bubbles", Prix Ars Electronica Catalog 1999, Springer-Verlag, Berlin, Germany; available online at <http://hosting.zkm.de/wmuench/bub/text>, downloaded on Mar. 16, 2007.
Notice of Opposition in European Application No. 02739710.8 dated May 14, 2007.
Provision of the minutes in European Application No. 02739710.8 dated Dec. 28, 2009.
Decision revoking the European Patent in European Application No. 02739710.8. dated Dec. 28, 2009.
Observation by third party Michael Saup dated Jan. 17, 2005, cited during opposition of European Application No. 02739710.8, filed Jun. 4, 2002.
Observation by third party Petra Trefzger dated Jan. 17, 2005, cited during opposition of European Application No. 02739710.8, filed Jun. 4, 2002.
Observation by third party Simon Penny dated Jan. 17, 2005, cited during opposition of European Application No. 02739710.8, filed Jun. 4, 2002.
Paradiso, Joseph et al., "New Sensor and Music Systems for Large Interactive Surfaces," Aug. 2000, Proceedings of the Interactive Computer Music Conference, Berlin, Germany, pp. 277-280.
Penny, Simon, "Fugitive"; Oct. 1997; <http://www.ace.uci.edu/penny/works/fugitive/fugitive.html>.
Penny, Simon, et al., "Fugitive II, " Jan. 8-Mar. 14, 2004, Australian Center for the Moving Image, art installation, description available online at <http://www.acmi.net.au/fugitive.jsp?>.
Penny, Simon, et al.; Traces: Wireless full body tracking in the Cave, Dec. 16-18, 1999; Japan; ICAT Virtual Reality Conference; <http://turing.ace.uci.edu/pennytexts/traces/>.
Pinhanez, C. et al., "Ubiquitous Interactive Graphics," Jul. 29-31 2003, IBM Research Report RC22495, available at <http://www.research.ibm.com/ed/publications/rc22495.pdf>.
Pinhanez, C., "The Everywhere Displays Projector: A Device to Create Ubiquitous Graphical Interfaces," Ubicomp 2001: Ubiquitous

(56) References Cited

OTHER PUBLICATIONS

Computing: International Conference Atlanta, Georgia, USA, Sep. 30-Oct. 2, 2001 Proceedings (Lecture Notes in Compute.
Plasma; 3 pages; <http://www.particles.de/paradocs/plasma/index.html>, cited in U.S. Appl. No. 10/160,217 on Aug. 8, 2005.
Rekimoto, J., et al., "Perceptual Surfaces: Towards a Human and Object Sensitive Interactive Display," Oct. 19-21, 1997, Proceedings of the Workshop on Perceptual User Interfaces, Banff, Canada, pp. 30-32.
Ringel, M. et al., "Barehands: Implement-Free Interaction with a Wall-Mounted Display," Mar. 31-Apr. 5, 2001, Proceedings of the 2001 ACM CHI Conference on Human Factors in Computing Systems (Extended Abstracts), p. 367-368.
Rogala, Miroslaw, "Lovers Leap," Nov. 21-26, 1995, art installation, Dutch Electronic Arts Festival, description available online at <http://wayback.v2.nl/DEAF/persona/rogala.html>.
Rokeby, David, "Very Nervous System (VNS)," Mar. 1995, Wired Magazine, available online at <http://www.wired.com/wired/archive/3.03/rokeby.html>; sold as software at <http://homepage.mac.com/davidrokeby/softVNS.html>.
Rokeby, David, "softVNS 2 real time video processing and tracking software for Max;" SoftVNS 2 downloads, as downloaded from <http://homepage.mac.com/davidrokeby/softVNS.html> on Mar. 16, 2007.
Sato, Yoichi, et al., "Fast Tracking of Hands and Fingertips in Infrared Images for Augmented Desk Interface," Mar. 2000, 4th International Conference on Automatic Face -and Gesture-Recognition, Grenoble, France.
Schneider, John K., "Improved Fingerprint System Using Rolled and Multi-segmented Techniques," Provisional U.S. Appl. No. 60/575,952, filed Jun. 1, 2004, pp. 1-6.
Sester, Marie, "Access," Dec. 2001, Interaction 99 Biennial Catalog, Gifu, Japan, available online at <http://www.accessproject.net/concept.html>.
Snibbe, Scott, "Boundary Functions," Sep. 7-12, 1998, art installation, description available online at <http://snibbe.com/scott/bf/index.html>.
Snibbe, Scott, "Screen Series," 2002-2003 art installation, description available online at <http://snibbe.com/scott/screen/index.html>, downloaded on Mar. 16, 2007.
Sonneck, Georg, et al., "Optimized One-to-One Personalization of Web Applications using a Graph Based Model," IEEE-22, Apr. 26, 2003, 9 pgs.
Sparacino, Flavia, et al., "Media in performance: interactive spaces for dance, theater, circus and museum exhibits," Nov. 2000, IBM Systems Journal, vol. 39, No. 3-4, pp. 479-510.
Sparacino, Flavia, "(Some) computer visions based interfaces for interactive art and entertainment installations," 2001, INTER_FACE Body Boundaries, Anomalie digital_arts, No. 2, Paris, France, <http://alumni.media.mit.edu/~flavia/publications.html>, cite.
Stauffer, Chris, et al., "Learning Patterns of Activity Using Real-Time Tracking," Aug. 2000, IEEE Transaction on Pattern Analysis and Machine Intelligence, vol. 22, No. 8, pp. 747-757.
Summons to Attend Oral Proceedings in European Application No. 02739710.8, dated Aug. 12, 2005.
Summons to Attend Oral Proceedings in European Application No. 02739710., dated Jun. 12, 2009.
Supreme Particles, "PLASMA/Architexture," 1994, available online at <http://www.particles.de/paradocs/plasma/plasma_e.html>, downloaded on May 21, 2007.
Supreme Particles; R111, 1999, available online at <http://www.r111.org>, obtained Jul. 12, 2005, XP-002989704.
Tan, P, et al., "Highlight Removal by Illumination-Constrained Inpainting," Ninth IEEE International Conference on Computer Vision, Oct. 13-16, 2003.
The History of Microsoft Surface, downloaded from <http://www.microsoft.com/presspass/presskits/surfacecomputing/docs/SurfaceHistoryBG.doc> on Sep. 24, 2009.
Torr, P.H.S. et al., "The Development and Comparison of Robust Methods for Estimating the Fundamental Matrix," Sep./Oct. 1997, International Journal of Computer Vision, vol. 24, No. 3, pp. 271-300.
Toth, Daniel et al., "Illumination-Invariant Change Detection," Apr. 2-4, 2000, 4th IEEE Southwest Symposium on Image Analysis and Interpretation, p. 3.
Trefzger, Petra, "Vorwerk," 2000, art installation, description available online at <http://www.petracolor.de/> cited on Jan. 17, 2005 during opposition of European Application No. 02739710.8, filed Jun. 4, 2002.
Utterback, Camille, et al., "Text Rain," 1999, art installation, available online at <www.camilleutterback.com/textrain.html>, Mar. 16, 2007.
Vogt, Florian et al., "Highlight Substitution in Light Fields," IEEE International Conference on Image Processing, Sep. 22-25, 2002.
Wang, Junxian, et al., "Specular reflection removal for human detection under aquatic environment," Jun. 27-Jul. 2, 2004 IEEE Conference on Computer and Pattern Recognition Workshop (CVPRW04) vol. 8, p. 130.
Wellner, Pierre, "Interacting with paper on the DigitalDesk," Jul. 1993, Communications of the ACM, Special issue on computer augmented environments: back to the real world, vol. 36, Issue 7, pp. 87-96.
Wellner, Pierre, "Digital Desk Calculator:Tangible Manipulation on a Desktop Display" Proceedings of the Symposium on User Interface Software and Technol (UIST), Hilton Head, S. Carolina, Nov. 11-13, 1991.
Wilson, Andrew, "PlayAnywhere: A Compact Interactive Tabletop Projection-Vision System," ACM Symposium on User Interface Software and Technology (UIST), Oct. 23-27, 2005, Seattle, Washington, U.S.A.
Written Opinion for PCT/US2002/017843, filed Jun. 4, 2002.
Written Opinion of the International Searching Authority for PCT/US2004/035477, filed Oct. 25, 2004.
Written Opinion of the International Searching Authority for PCT/US2004/035478, filed Oct. 25, 2004.
Written Opinion of the International Searching Authority for PCT/US2004/041318, filed Dec. 9, 2004.
Written Opinion of the International Searching Authority for PCT/US2004/041319, filed Dec. 9, 2004.
Written Opinion of the International Searching Authority for PCT/US2004/041320, filed Dec. 9, 2004.
Written Opinion of the International Searching Authority for PCT/US2005/008984, filed Mar. 18, 2005.
Written Opinion of the International Searching Authority for PCT/US2006/030720, filed Aug. 4, 2006.
Written Opinion of the International Searching Authority for PCT/US2008/059900, filed Apr. 10, 2008.
DePiero et al; "3-D Computer Vision Using Structured Light: Design, Calibrations and Implementation Issues"; Advances in Computers, vol. 43, pp. 243-278, 1996.
Huang, Mark et al. "Shadow Vision," Introduction to Computer Graphics, Fall 1999, Dec. 6, 1999; pp. 1-10, XP55013291 http://groups.csail.mit.edu/graphics/classes/6.83.7/F99/projects/report/team16.pdf.
Langer, Maria, "Mac OS X 10.2: Visual QuickStart Guide," Sep. 17, 2002, Peachpit Press, p. 111.
Leibe, Bastian, et al., "The Perspective Workbench; Toward Spontaneous and Natural Interaction in Semi-Immersive Virtual Environments," Mar. 18-22, 2000, IEEE Computer Society, Los Alamitos, CA; pp. 13-20.
Paradiso, Joseph et al., "Optical Tracking for Music and Dance Performance," Conference on Optical 3-D Measurement Techniques, XX, XX, No. 4th, Sep. 30, 1997, pp. 1-8, XP002548974. http://www.media.mit.edu/resenv/pubs/papers/97_09_Zurich_3D4.pdf.

(56) References Cited

OTHER PUBLICATIONS

Quinz, Emanuele; "Conference Papers", Apr. 10, 2001, XP55013293, Retrieved from the internet http://www.isea2000.com/pop_actes.htm.

Quinz, Emanuele; "Digital Performance", pp. 1-3, Retrieved from the internet on Nov. 28, 2011 http://www.noemalab,org/sections/ideas/ideas_articles/pdf/.

Rekimoto, Jun, "SmartSkin: An Infrastructure for Freehand Manipulation on Interactive Surfaces." vol. No. 4, Issue No. 1, pp. 113-120, Apr. 2002.

Sparacino, Flavia, et al., "Dance Space: An Interactive Video Interface", Actes/Proceeding, ISEA2000-Oct. 12, 2000-Auditorium 1, Dec. 10, 2000.

Xiao, Yang; "Throughput and Delay Limits of IEEE 802.11," IEEE Communications Letters, vol. 6, No. 8, pp. 355-357, Aug. 2002.

\* cited by examiner

METHOD AND SYSTEM FOR STATE-BASED CONTROL OF OBJECTS

FIELD OF INVENTION

The present invention relates to the field of computer-generated graphics. Specifically, embodiments of the present invention relate to a method and system for state-based control of objects.

BACKGROUND OF THE INVENTION

Recent technological advancements have led to the creation of a new interactive medium, the interactive video display system. Interactive video display systems allow real-time unencumbered human interactions with video displays. Natural physical motions by human users are captured by a computer vision system and used to drive visual effects. The computer vision system usually uses images captured by a video camera as input and has software processes that gather real-time information about people and other objects in the scene viewed by the camera. An output image is generated based on the human interaction as applied to an effects engine.

In order to customize the interaction with a user, artists can design different pieces of content, also referred to herein as "spots" or "video spots," using the effects engine. A typical prior art effects engine is a large software component that is not easily changeable by the artist. Moreover, due to the large size of these effects engines, they are typically limited as to the number of objects that can be operated on by the effects engine.

For example, prior art effects engine often have difficulty providing position information, such as determining whether the object has entered a particular region or whether to trigger a collision between objects. Also, it may be difficult to dynamically generate objects. Furthermore, since there is no standard for particles or moving interactive objects, scripts created by an artist typically cannot be reused. This causes work of creating the scripts to be wasted or duplicated, reducing artist efficiency and increasing spot development costs. Moreover, due to the complexity of some desired effects and the limits of the effects engine, it may not be possible to create certain desired effects.

SUMMARY OF THE INVENTION

Various embodiments of the present invention, a method and system for state-based control of objects, are described herein. In one embodiment, the present invention provides a system for state-based control of objects including a simulator, a state manager, and a plurality of software nodes. A simulator controls data associated with a plurality of objects, the simulator including a first list of the plurality of objects and a data structure comprising data defining the plurality of objects. A state manager includes a plurality of states, wherein a state includes a second list of a subset of objects of the plurality of objects and determines a display appearance and a display action of the subset of objects. A plurality of software nodes are operable to perform associated operations on subsets of objects and to update data of the data structure for the subset of the objects. In one embodiment, the software nodes are operable to dynamically update the data structure.

In one embodiment, the simulator is operable to periodically generate a timing signal and wherein the software node is operable to perform an associated operation on the subset in response to receiving the time signal. In one embodiment, the software node is operable to perform an associated operation on the subset in response to receiving a signal indicating a change in an image.

In one embodiment, a state is associated with at least one the software node, wherein a state defines an effect. In one embodiment, the object is the minimal unit of an effect.

In one embodiment, the software node comprises a state change operation for changing a state of the subset of the objects. In other various embodiments, the software node may include an enabling operation for enabling a feature of objects of the subset, an object creation operation for creating at least one object, an object removal operation for removing at least one object, or a force operation for applying a force to objects of the subset. In another embodiment, the software node is operable to add new objects by updating the data structure to include data associated with the new objects.

In another embodiment, the present invention provides a method for state-based control of objects. Positions of a plurality of objects are updated by extracting data defining the plurality of objects from a data structure. A signal is received at at least one software node of a plurality of software nodes, wherein the software node is operable to perform an associated operation on a subset of the plurality of objects, wherein the subset is determined according to a state defining a display appearance and a display action of objects of the subset. A call for rendering data of the data structure is received. In one embodiment, the data of the data structure is updated for the subset of the objects. In one embodiment, the signal is a time signal. In another embodiment, the signal indicates a change in an image.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1A:
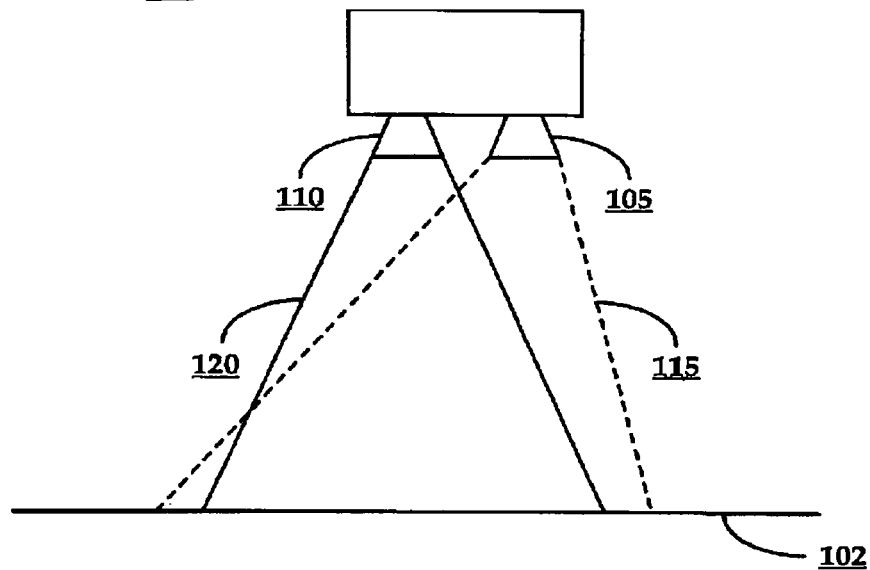
FIG. 1A illustrates a projection interactive video display system, in accordance with an embodiment of the present invention.

Reference will now be made in detail to various embodiments of the invention, a method and system for state-based control of objects, examples of which are illustrated in the accompanying drawings. While the invention will be described in conjunction with these embodiments, it is understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the invention, numerous specific details are set forth in order to provide a thorough understanding of the invention. However, it will be recognized by one of ordinary skill in the art that the invention may be practiced without these specific details. In other instances, well known methods, procedures, components, and circuits have not been described in detail as not to unnecessarily obscure aspects of the invention.

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "defining" or "determining" or "identifying" or "performing" or "generating" or "receiving" or "updating" or "identifying" or the like, refer to the action and processes of an electronic system (e.g., object control system 300 of FIG. 3), or similar electronic computing device, that manipulates and transforms data represented as physical (electronic) quantities within the electronic device's registers and memories into other data similarly represented as physical quantities within the electronic device memories or registers or other such information storage, transmission or display devices.

Various embodiments of the present invention in the form of one or more exemplary embodiments will now be described. The described embodiments may be implemented on an interactive video display system including a vision system that captures and processes information relating to a scene. The processed information is used to generate certain visual effects that are then displayed to human users via an interactive display device. Human users are able to interact with such visual effects on a real-time basis.

FIG. 1A illustrates a projection interactive video display system 100 in accordance with an embodiment of the present invention. Projection interactive video display system 100 uses a camera 105, a projector 110 that projects an image 120 onto the interactive space 115 of surface 102, and a local computer (not shown) that takes as input the image of camera 105 and outputs a video image to projector 110.

The local computer processes the camera 105 input to discern on a pixel-by-pixel basis what portions of the volume in front of surface 102 (e.g., interactive space 115) are occupied by people (or moving objects) and what portions of surface 102 are background. The local computer may accomplish this by developing several evolving models of what the background is believed to look like, and then comparing its concepts of the background to what camera 105 is currently imaging. Alternatively, components of the local computer that process camera 105 input are collectively known as the vision system (e.g., vision system 210 of FIG. 2). Various embodiments of projection interactive video display system 100 and the vision system are described in co-pending U.S. patent application Ser. No. 10/160,217, filed on May 28, 2002, entitled "INTERACTIVE VIDEO DISPLAY SYSTEM," by Bell, and assigned to the assignee of the present application, and in co-pending U.S. patent application Ser. No. 10/974,044, filed on Oct. 25, 2004, entitled "METHOD AND SYSTEM FOR PROCESSING CAPTURED IMAGE INFORMATION IN AN INTERACTIVE VIDEO SYSTEM," by Bell, and assigned to the assignee of the present application, both of which are herein incorporated by reference.

Figure 1B:
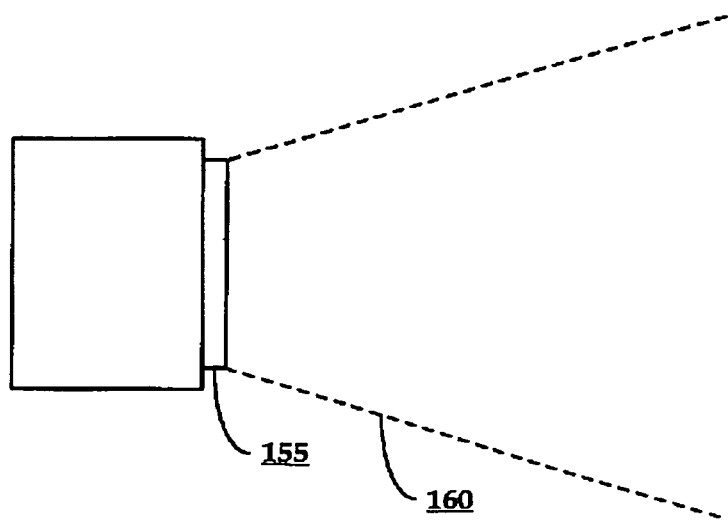
FIG. 1B illustrates a self-contained interactive video display system, in accordance with an embodiment of the present invention.

FIG. 1B illustrates a self-contained interactive video display system 150 in accordance with an embodiment of the present invention. Self-contained interactive video display system 150 displays an image onto display screen 155, and uses a camera (not shown) to detect people and objects in interactive space 160. A local computer, also referred to as the image system, takes as input the image of the camera and outputs a video image to display screen 155.

Various embodiments of self-contained interactive video display system 150 are described in co-pending U.S. patent application Ser. No. 10/946,263, filed on Sep. 20, 2004, entitled "SELF-CONTAINED INTERACTIVE VIDEO DISPLAY SYSTEM," by Bell et al., and assigned to the assignee of the present application, co-pending U.S. patent application Ser. No. 10/946,084, filed on Sep. 20, 2004, entitled "SELF-CONTAINED INTERACTIVE VIDEO DISPLAY SYSTEM," by Bell, and assigned to the assignee of the present application, and co-pending U.S. patent application Ser. No. 10/946,414, filed on Sep. 20, 2004, entitled "INTERACTIVE VIDEO WINDOW DISPLAY SYSTEM," by Bell, and assigned to the assignee of the present application, all of which are herein incorporated by reference. Furthermore, various embodiments of the vision system are described in co-pending U.S. patent application Ser. No. 10/160,217, filed on May 28, 2002, entitled "INTERACTIVE VIDEO DISPLAY SYSTEM," by Bell, and assigned to the assignee of the present application, and in co-pending U.S. patent application Ser. No. 10/974,044, filed on Oct. 25, 2004, entitled "METHOD AND SYSTEM FOR PROCESSING CAPTURED IMAGE INFORMATION IN AN INTERACTIVE VIDEO SYSTEM," by Bell, and assigned to the assignee of the present application, both of which are herein incorporated by reference.

Various embodiments of the present invention are described herein. According to one embodiment of the interactive video display system (e.g., projection interactive video display system 100 of FIG. 1A), there is an input image from a monochrome camera (e.g., camera 105 of FIG. 1A) and a computer vision system that is able to separate foreground objects of interest (e.g., people) from the background of the input image in real time so that the location and outline of the foreground objects can serve as input to an interactive application.

The camera input image is an image representing a real world scene viewed by the camera. This real world scene contains a static background of unknown brightness and appearance as well as various foreground objects that are able to move, such as, people and objects held or moved by people. The camera input image may be manipulated or cropped so that the area viewed by the camera corresponds to the boundaries of a display.

Figure 2:
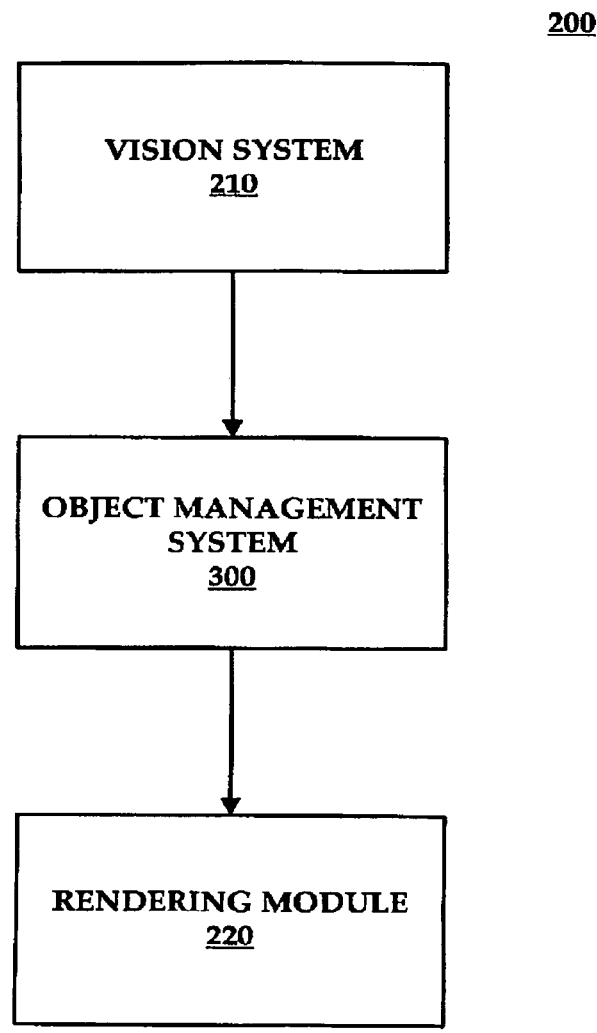
FIG. 2 illustrates a system for rendering object data, in accordance with an embodiment of the present invention.

FIG. 2 illustrates a system 200 for rendering object data, in accordance with an embodiment of the present invention. System 200 includes vision system 210, object management system 300, and rendering module 220. Vision system 210 is operable to outputs a foreground/background distinction image that corresponds to the camera input image. Each pixel in this image is capable of assuming one of two values: one value for foreground and another value for background. This pixel's value represents whether the vision system determines the pixel with the same position in the camera input image is foreground or background. In one exemplary embodiment, the foreground/background distinction image is an 8-bit grayscale image, with a pixel value of "0" for background and a pixel value of "255" for foreground.

In one embodiment, the foreground/background distinction image is used to generate a gradient image. The gradient image includes the foreground as defined by the foreground/background distinction image with force vectors perpendicular to the foreground objects representing the forces exerted by the foreground objects. In one embodiment, the gradient image is used as the input to a software node (e.g., of software nodes 330 of FIG. 3).

Figure 3:
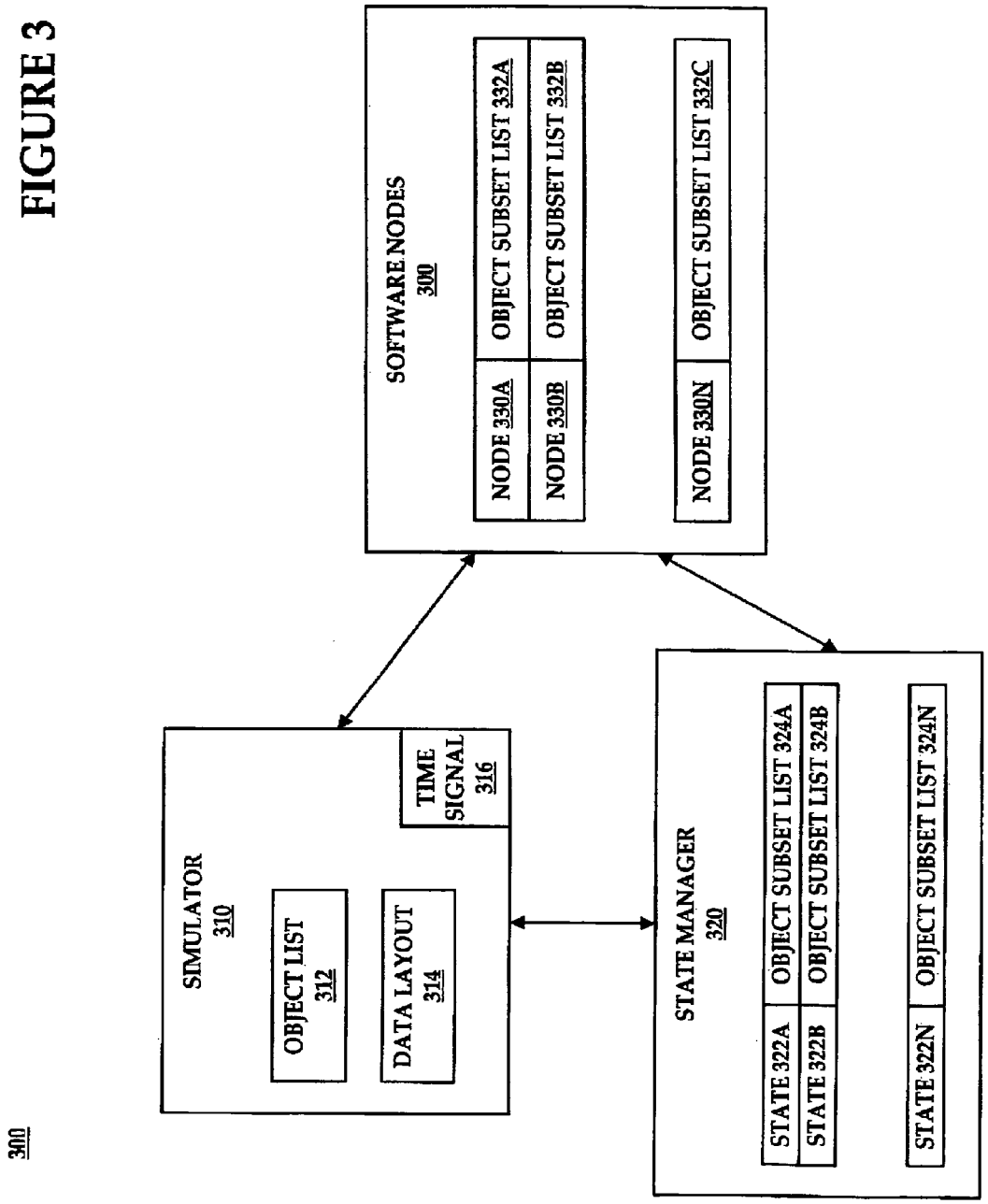
FIG. 3 illustrates a system for state-based control of objects, in accordance with an embodiment of the present invention.

Object management system 300 is operable to control and manage the data associated with the appearance of objects. FIG. 3 illustrates object management system 300 for state-based control of objects, in accordance with an embodiment of the present invention. Object management system 300 includes simulator 310, state manager 320 and software nodes 330. Objects are instances of data that can be changed by effects, thus changing the on-screen appearance of the object. For instance, an effect may change the screen location, speed, and acceleration of the object. In one embodiment, the object is the minimal unit of an effect.

Simulator 310 is operable to control data associated with a plurality of objects, and includes object list 312 and data layout 314 to control and manage the data. Object list 312 includes a list of all objects controlled by simulator 310. Data layout 314 is a data structure including the data that defines the objects included in object list 312. By maintaining data layout 314 separate from object list 312, it is possible to dynamically update data layout 314 without modifying object list 312, improving processing speed.

In one embodiment, simulator 310 includes time signal 316. Time signal 316 is a periodic time signal associated with a clock cycle. It should be appreciated that simulator 310 may generate time signal 316 or receive time signal 316 from an external source. Time signal 316 is used for directing certain software nodes to execute.

State manager 320 includes a plurality of states 322a-n, wherein a state is a list of a subset of the objects of object list 312 (e.g., object subset lists 324a-n). It should be appreciated that state manager 320 can include any number of states. A state determines a display appearance and a display action of the subset of objects. In one embodiment, a state includes a user-defined list. A state determines which objects are executed by a particular software node or a group of software nodes. In other words, a state defines an effect. A user selects which objects are included in a state and which software node or nodes are executed on the selected subset of objects.

As described above, in one embodiment, a state includes one associated software node. By associating a state with a single software node, processing time for executing the software node is improved, because the associated subset of objects is already included in the state.

Software nodes 330 include any number of software nodes 330a-n for performing associated operations on a subset of objects (e.g., object subset lists 332a-n). In one embodiment, the object subset list for a corresponding software node is received from state manager 320. For example, a software node assign properties to an object, create or delete an object, enable enhanced features of an object, apply forces to an object, select an object, change the state of an object, or many other operations. The following are lists of exemplary software nodes that can be used in various embodiments of the present invention.

Assign software nodes—assign properties to objects:
Assign mass software node—control mass of the object;
Assign position software node—control position of the object;
Assign renderable software node—control rendering of the object;
Assign rotation software node—control rotation of the object;
Assign shape software node—control shape of the object;
Assign state software node—control state of the object; and
Assign velocity software node—control velocity of the object.
Emit software nodes—create or delete objects:
Delete software node—delete an object;
Emit software node—create an object;
Emit copy software node—create new object by copying positions and velocities of old objects;
Emit pattern software node—create new objects in a specific pattern;
Emit pointlist software node—create new objects at a list of positions;
Emit rate software node—create new objects at a particular rate;
Emit sprinkle software node—create new objects based on image input; and
Reset software node—causes simulation to reset.
Enable software nodes—enable optional object features:
Enable jello software node—interaction makes object distort;
Enable render software node—render objects as a three-dimensional renderable nodes that use an openGL environment; and
Enable shape software node—enable objects to be assigned shapes, so that they can later be used for detecting and controlling interactions such as collisions.
Force software nodes—apply forces to objects:
Force friction software node—slows down movement of an object;
Force gradient software node—move object according to a gradient image;
Force gravity software node—move object toward or away from a point;
Force input software node—apply a force to an object;
Force repulsion software node—make all objects push away from each other;
Force roll software node—rotate an object; and
Force wind software node—all objects move in a selected direction at a selected speed.
Selection software nodes—selects certain types of objects:
Select age software node—select objects greater than a certain age;
Select collision software node—outputs reported collisions;
Select count software node—provide a count of all objects;
Select image software node—reads from an image at each object position;
Select join software node—outputs a combination of two object inputs;
Select pressure software node—indicates whether an object was interacted with; and
Select rotation software node—output a list of objects above a certain rotation.

State software nodes—declare a state that can contain objects within it or can direct objects to another state.

A user is able to define states that include subsets of objects, and have selected software nodes applied to the subsets to create a desired spot or presentation. For example, a state may be defined for deleting objects that have reached a certain age. The select age software node is used to select these objects, and the delete object software node is applied to the selected objects, thereby deleting them. Many different combinations of software nodes can be used to define many different states.

Software nodes may be executed in response to receiving signals. In one embodiment, a software node is operable to perform an associated operation in response to receiving time signal 316. For example, the selection software nodes may be executed periodically according to time signal 316. In another embodiment, a software node is operable to perform an associated operation on in response to receiving a signal indicating a change in an image. In another embodiment, a software node is operable to perform an associated operation in response to receiving a signal indicating a change in state of an object.

Moreover, it should be appreciated that the software nodes may include additional user-defined attributes. For example, the assign shape software node allows a user to define a shape. In another example, the emit pattern software node allows a user to select or define a pattern for creating new objects.

A software node is also operable to update data for associated objects. For instance, software node 330a of FIG. 3 is operable to update the data of data layout 314 for objects in object subset list 332a. In one embodiment, the software nodes are operable to update the data of data layout 314 dynamically. In another embodiment, a software node is operable to update the data of data layout 314 to include new objects.

With reference again to FIG. 2, rendering module 220 is shown. The data for objects that is stored in data layout 314 of FIG. 3 is accessible for rendering. In one embodiment, the data is rendered using a projection display (e.g., interactive video display system 100 of FIG. 1A). In another embodiment, the data is rendered using a flat-panel display (e.g., self-contained interactive video display system 150 of FIG. 1B). In another embodiment, the data can be rendered audibly. In another embodiment, the data can be rendered using other types of electronic devices (e.g., lights, automatic doors, etc.) It should be appreciated that the data can be rendered by rendering module 220 in many different types of ways, and is not intended to be limited to the described embodiments.

Figure 4:
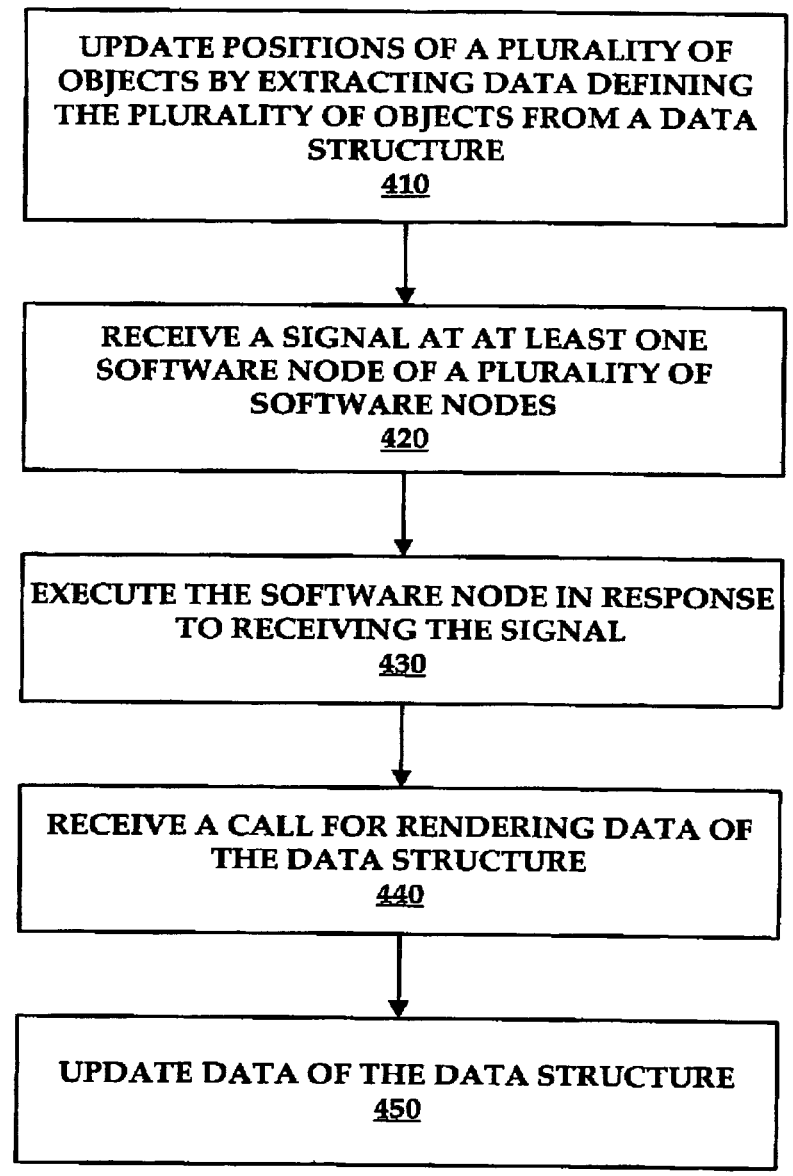
FIG. 4 illustrates a process for state-based control of objects, in accordance with an embodiment of the present invention.

FIG. 4 illustrates a computer-controlled process 400 for state-based control of objects, in accordance with an embodiment of the present invention. In one embodiment, process 400 is carried out by processors and electrical components (e.g., object management system 300 of FIG. 3) under the control of computer readable and computer executable instructions, such as the described vision system. Although specific steps are disclosed in process 400, such steps are exemplary. That is, the embodiments of the present invention are well suited to performing various other steps or variations of the steps recited in FIG. 4. For purposes of simplicity, process 400 describes the steps associated with one clock cycle of an object management system.

At step 410 of process 400, positions of a plurality of objects are updated. In one embodiment, the positions are updated by extracting data defining the plurality of objects from a data structure (e.g., data layout 314 of FIG. 3). In one embodiment, the velocities of the plurality of objects is also updated. In one embodiment, simulator 300 is operable to perform a solver operation for determining the positions and velocities of all objects. For example, the solver may calculate the force exerted on an object according to a force software node. Other examples include the solver calculating the velocity from the assign velocity software node, the solver calculating the position from the assign position software node, or identifying collisions between objects according to the select collision software node.

At step 420 a signal is received for directing at least one software node to perform associated operations on a subset of the objects. The subset is determined according to a state defining a display appearance and a display action of objects of the subset. In one embodiment, the state is controlled by state manager 320 of FIG. 3. In one embodiment, the signal is a time signal. In another embodiment, the signal indicates a change in an image. In another embodiment, the signal indicates a change in state of an object or subset of objects. In one embodiment, a state is associated with at least one the software node, wherein a state defines an effect. In one embodiment, the object is the minimal unit of an effect.

At step 430, the software node is executed in response to the signal. Depending on the type of signal (e.g., time signal, image change signal, or state change signal), certain software nodes execute. As described above, in one embodiment, a software node is operable to perform an associated operation in response to receiving time signal 316 of FIG. 3. For example, the selection software nodes may be executed periodically according to time signal 316. In another embodiment, a software node is operable to perform an associated operation on in response to receiving a signal indicating a change in an image. In another embodiment, a software node is operable to perform an associated operation in response to receiving a signal indicating a change in state of an object. It should be appreciated that steps 420 and 430 may be performed in any order relative to steps 410, 440 and 450. Moreover, it should be appreciated that steps 420 and 430 may be performed multiple times during process 400. For example, steps 420 and 430 may be performed for a time signal early in process 400, and then performed for an image change signal later in process 400.

In one embodiment, the software node comprises a state change operation for changing a state of the subset of the objects. In other various embodiments, the software node may include an enabling operation for enabling a feature of objects of the subset, an object creation operation for creating at least one object, an object removal operation for removing at least one object, or a force operation for applying a force to objects of the subset. In another embodiment, the software node is operable to add new objects by updating the data structure to include data associated with the new objects.

At step 440, a call for rendering data of the data structure is received. As described above, the data for objects that is stored in data layout 314 of FIG. 3 is accessible for rendering, e.g., by rendering module 220 of FIG. 2. In one embodiment, the data is rendered using a projection display (e.g., interactive video display system 100 of FIG. 1A). In another embodiment, the data is rendered using a flat-panel display (e.g., self-contained interactive video display system 150 of FIG. 1B). In another embodiment, the data can be rendered audibly. In another embodiment, the data can be rendered using other types of electronic devices (e.g., lights, automatic doors, etc.) It should be appreciated that the data can be rendered by many different types of ways, and is not intended to be limited to the described embodiments.

At step 450, data of the data structure for the subset of the objects is updated. In one embodiment, the data of the data structure is updated by the software nodes. In one embodiment, the software nodes are operable to dynamically update the data structure. The software nodes also may be operable to add new objects by updating the data structure to include data associated with the new objects.

In an exemplary implementation, the present invention is implemented using software in the form of control logic, in either an integrated or a modular manner. Alternatively, hardware or a combination of software and hardware can also be used to implement the present invention. Based on the disclosure and teachings provided herein, a person of ordinary skill in the art will know of other ways and/or methods to implement the present invention.

Various embodiments of the present invention, a method and system for state-based control of objects, are described herein. In one embodiment, the present invention provides a for state-based control of objects, allowing users to define states as including a subset of objects and associated with specified software nodes. By providing a framework in which the appearance of objects is controlled according to a state, a user designing a spot is provided with improved functionality. Moreover, by storing the data in a separate data structure, performance of the system is improved, increasing the number of objects that may be controlled and improving the appearance of the objects.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

Various embodiments of the invention, a method and system for state-based control of objects, are thus described. While the present invention has been described in particular embodiments, it should be appreciated that the invention should not be construed as limited by such embodiments, but rather construed according to the below claims.

What is claimed is:

1. A method for state-based control of objects in an interactive video display system including a camera based interface, the method comprising:
   storing an object list comprising a plurality of objects;
   storing a data structure comprising properties associated with respective objects, wherein the properties indicate display actions or display appearances of respective objects;
   defining a state to include a subset of objects of the object list that are selected by user input;
   associating a first software node with the state;
   associating a second software node with the state;
   in response to receiving a first signal indicating execution of the first software node, executing the first software node on the subset of objects of the state to modify one or more properties of the subset of objects in the state stored in the data structure, wherein the first signal is representative of a first user interaction with an interactive video display system;
   in response to receiving a second signal indicating execution of the second software node, executing the second software node on the subset of objects of the state to modify one or more properties of the subset of objects in the state stored in the data structure, wherein the second signal is representative of a second user interaction with the interactive video display system; and
   rendering the objects that have been modified by the software nodes on a display device of the interactive video display system.

2. The method of claim 1, further comprising executing a third software node to create a new object based on a property of another object.

3. The method of claim 1, further comprising executing a third software node to delete an object based on a property of another object.

4. The method of claim 1, wherein the first software node calculates a force to be applied to each of the objects indicated by the state based at least in part on the first user interaction with the interactive video display system.

5. The method of claim 1, wherein the first software node calculates an alteration of position or velocity to be applied to each of the objects indicated by the state based at least in part on the first user interaction with the interactive video display system.

6. The method of claim 1, wherein the first signal is further representative of a timing signal that controls the execution of the first software node.

7. A computerized method for controlling objects in an interactive video display system, the method comprising:
   storing properties of a plurality of objects in memory, the plurality of objects appearing on an interactive video display;
   receiving user interaction data indicating one or more interactions of a user with the interactive video display;
   associating a first subset of the plurality of objects with a first software node based at least in part on the user interaction data, wherein the first subset comprises two or more objects;
   associating a second subset of the plurality of objects with a second software node based at least in part on the user interaction data, wherein the second subset comprises two or more objects, including at least one object that is in the first subset of objects;
   executing the first software node on each of the objects in the first subset of objects at a computing device, wherein execution of the first software node changes at least a first property of each of the objects in the first subset of objects;
   executing the second software node on each of the objects in the second subset of objects at a computing device, wherein execution of the second software node changes at least a second property of each of the objects in the second subset of objects; and
   initiating display of the subset of objects on the interactive video display.

8. The method of claim 7, wherein the at least a first property defines a display appearance or a display action.

9. The method of claim 7, wherein the first subset of the plurality of objects is selected based in part on a property of the objects.

10. The method of claim 7, further comprising executing a third software node to create a new object based on a property of an object in the first subset of objects.

11. The method of claim 7, further comprising executing a third software node to remove an object from the first subset of objects based on a property of the object.

12. A computing system for managing objects in an interactive video display system including an imaging device, the system comprising:
   a non-transitory computer readable medium configured to store properties associated with respective objects of a plurality of objects, wherein at least some of the properties associated with the respective objects indicate appearance characteristics of the respective objects;

an interface configured to receive user interaction data from an imaging device, the user interaction data indicating user interactions with the a video display; and a processor configured to:
associate a first subset of the plurality of objects with a first state based on the user interaction data, wherein the first subset comprises two or more objects;
associate a second subset of the plurality of objects with a second state based on the user interaction data, wherein the second subset comprises two or more objects, including at least one of the objects of the first subset;
execute a first software node on each of the plurality of objects associated with the first state, wherein execution of the first software node changes a first property of the objects in the first subset; and
execute a second software node on each of the plurality of objects associated with the second state, wherein execution of the second software node changes a second property of the objects in the second subset.

13. The system of claim 12, wherein the processor is further configured to:
associate the first software node with the first state, and
execute the first software node on objects associated with the first state.

14. The system of claim 12, wherein the objects in the first subset of the plurality of objects are associated with the first state based at least in part on the user interaction data.

15. The system of claim 13, wherein executing the first software node on the first subset of the plurality of objects modifies a property of the respective objects based at least in part on the user interaction data.

16. The system of claim 13, wherein executing the first software node performs one or more of assigning a property to the objects associated with the first state, applying a force to the objects associated with the first state, deleting the objects associated with the first state, changing the state associated with the objects associated with the first state, and enabling a feature of the objects associated with the first state.

17. The system of claim 12, wherein the processor is further configured to:
initiate display of at least one of the objects associated with the first state on the video display.

18. A non-transitory tangible computer readable storage medium having software instructions stored thereon, the software instructions readable by a computing system comprising one or more computing devices, wherein the software instructions are executable on the computing system in order to cause the computing system to perform operations comprising:
storing properties of respective objects of a plurality of objects in a storage device, wherein the properties indicate respective display appearances or display actions of the respective objects;
receiving input data from a camera indicative of a first user interaction and a second user interaction with a video display;
generating a first list of two or more objects in response to the first user interaction;
generating a second list of two or more objects in response to the second user interaction, wherein the first and second lists each include a first object;
executing a first software node on the objects indicated by the first list to modify a respective first property of the objects;
executing a second software node on the objects indicated by the second list to modify a respective second property of the objects; and
initiating display of the modified objects on the video display.

19. The non-transitory tangible computer readable storage medium of claim 18, wherein the first list corresponds to a display effect of the objects indicated by the first list.

20. The non-transitory tangible computer readable storage medium of claim 19, wherein the operations further comprise:
associating the first software node with the first list of objects; and
executing the first software node only on the objects indicated by the first list of objects.

* * * * *